United States Patent
Barrere

(10) Patent No.: US 6,459,181 B1
(45) Date of Patent: Oct. 1, 2002

(54) ELECTRIC MOTOR UNIT, IN PARTICULAR FOR MOTOR VEHICLE, INCORPORATING A CONTROL ELECTRONICS

(75) Inventor: Franck Barrere, Croisilles (FR)

(73) Assignee: Valeo Systems d'Essuyage (FR)

( * ) Notice: Subject to any disclaimer, the term of this patent is extended or adjusted under 35 U.S.C. 154(b) by 0 days.

(21) Appl. No.: 09/646,260

(22) PCT Filed: Mar. 12, 1999

(86) PCT No.: PCT/FR99/00555

§ 371 (c)(1),
(2), (4) Date: Sep. 11, 2000

(87) PCT Pub. No.: WO99/48183

PCT Pub. Date: Sep. 23, 1999

(30) Foreign Application Priority Data

Mar. 13, 1998 (FR) .............................. 98 03128

(51) Int. Cl.$^7$ .............................. H02K 3/50; H02H 7/08
(52) U.S. Cl. .................. 310/68 C; 361/24; 318/471
(58) Field of Search .................. 310/68 C, 68 R, 310/67 R, 60; 361/23, 24, 25–28, 31, 32; 318/471, 472

(56) References Cited

U.S. PATENT DOCUMENTS

| 4,926,077 A | * | 5/1990 | Gauthier et al. | .......... 310/68 C |
| 5,101,315 A | * | 3/1992 | Ishikawa et al. | .............. 361/24 |
| 5,123,081 A | * | 6/1992 | Bachman et al. | ........... 388/934 |
| 5,343,613 A | * | 9/1994 | Kintz et al. | ..................... 29/596 |
| 5,627,710 A | * | 5/1997 | Schoeffler | ..................... 361/23 |
| 6,198,184 B1 | * | 3/2001 | Ohi et al. | .................. 310/68 C |

FOREIGN PATENT DOCUMENTS

| DE | 43 15 182 | 11/1994 |
| DE | 94 15 935 | 11/1994 |
| EP | 0 468 806 | 1/1992 |
| EP | 0 742 630 | 11/1996 |
| JP | 01286781 | 11/1989 |

* cited by examiner

Primary Examiner—Nestor Ramirez
Assistant Examiner—Dang Dinh Le
(74) Attorney, Agent, or Firm—J. Gordon Lewis

(57) ABSTRACT

An electric motor unit with continuous current containing a connection plate and a card that carries electronics for the control of the motor. The card also contains electronics to monitor the current in order to detect the blockage of the motor's rotor and electronics to control the power supply of the motor. The card and/or the plate carries devices to sense temperature. The electronics to control the power supply are linked to the device(s) sensing temperature, as well as to the electronics monitoring the current. The control electronics cuts off the power supply of the motor when blockage of the motor's rotor is detected and a temperature measured by at least one of the devices reaches a high threshold value and reestablishes the power supply of the motor when the temperature is at or below a low threshold value.

20 Claims, 2 Drawing Sheets

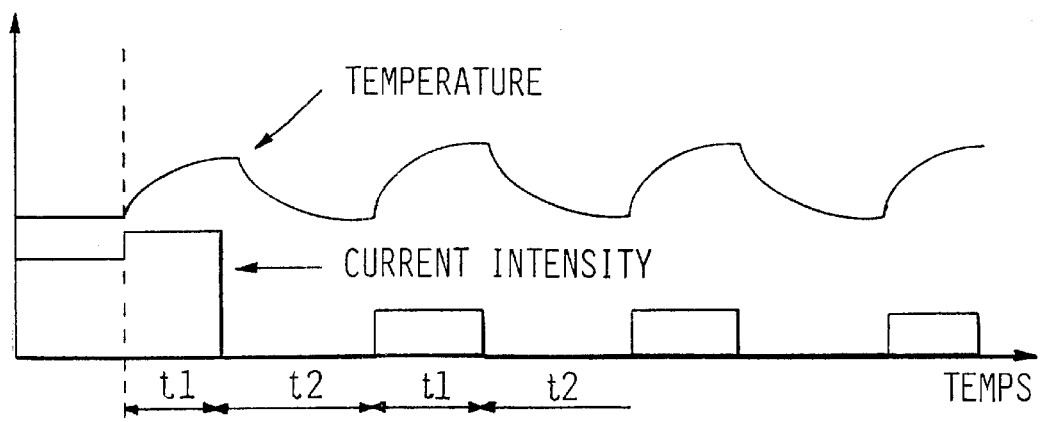
FIG_1
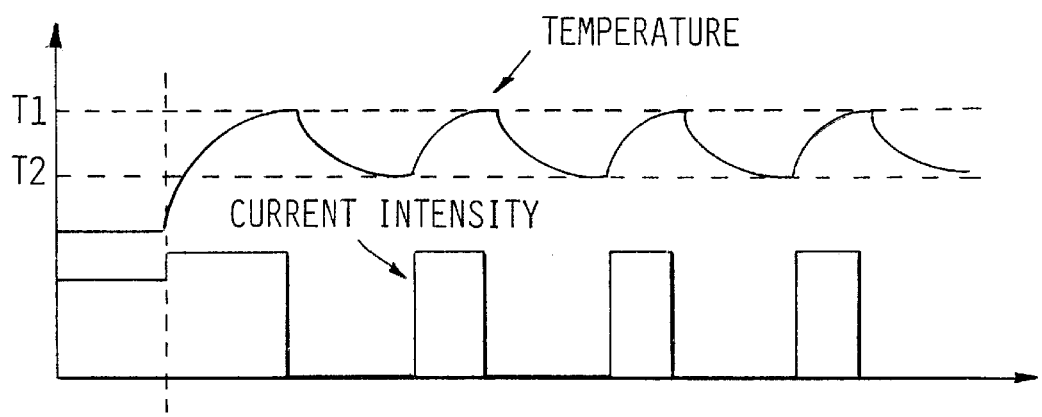
FIG_2

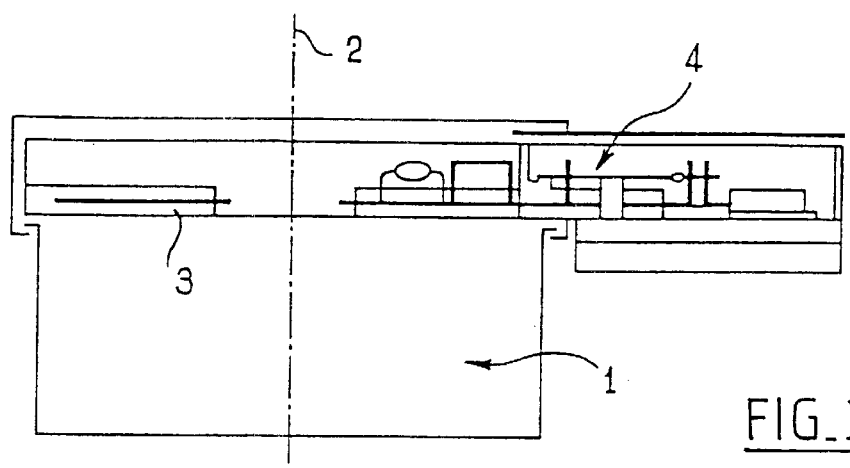
FIG_3
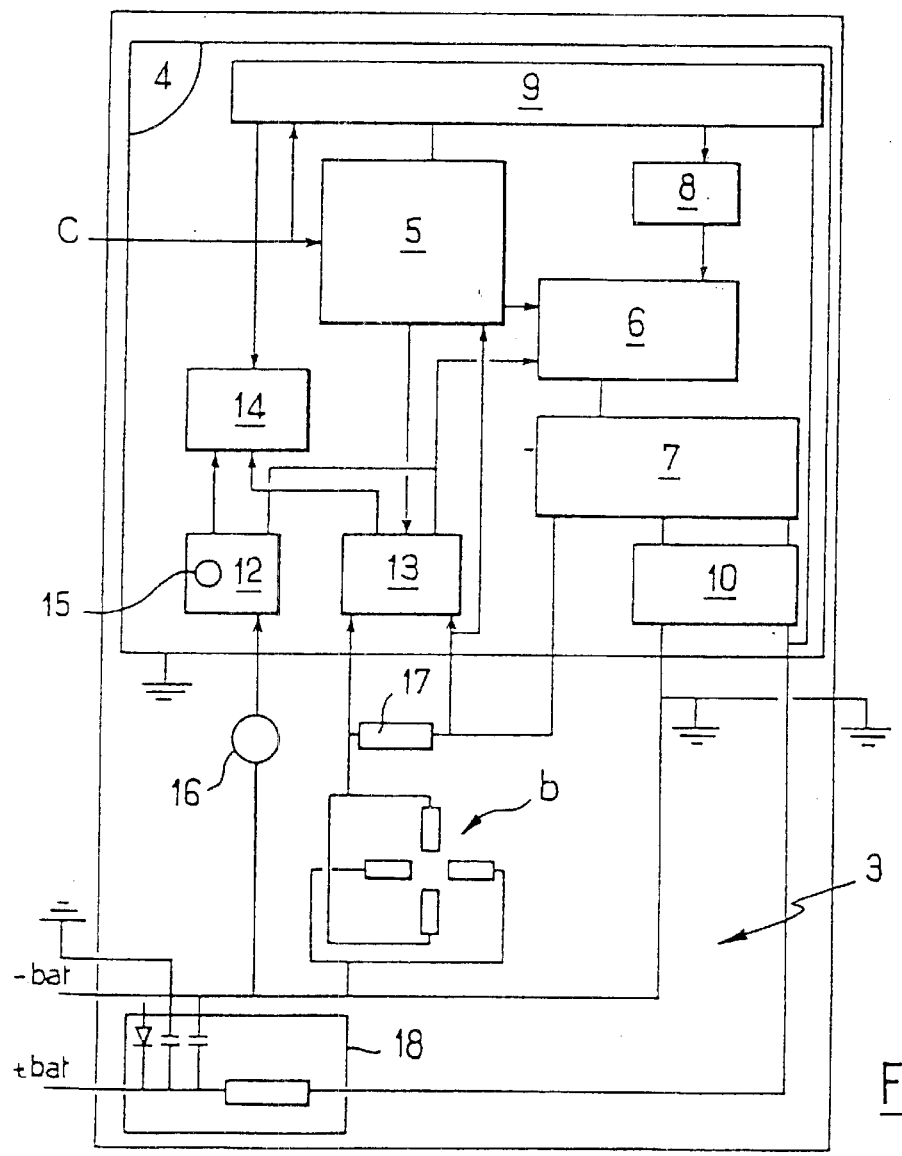
FIG_4

ELECTRIC MOTOR UNIT, IN PARTICULAR FOR MOTOR VEHICLE, INCORPORATING A CONTROL ELECTRONICS

BACKGROUND

The present invention is a unit including an electric motor with constant current and electronics for control of the motor. The electric motor unit proposed by this invention is particularly well suited for a motorized fan group of a motor vehicle.

The blockage of a rotor of an electric motor with constant current creates a strong increase in the current. On motors without electronics, this abrupt increase in current destroys the line fuse before the thermal elevation, the result of this increase and the disappearance of ventilation, damages the motor and, specifically, its tracks, its blades, or also the stripes of its connection plate, etc.

On the other hand, in the case of a motor unit incorporating an electronic control, the electronic control limits the current in the electric motor, which can prevent the destruction of the line fuse in the cases where this destruction would hardly be desirable, avoiding a too significant increase of the temperature to the level of the power components of the electric control and at the level of motor elements.

In order to compensate for this inconvenience, one must, once one detects the blockage of the rotor, control the power supply of the electric motor according to a functioning sequence of the type illustrated in FIG. 1, that is to say, according to a succession of cycles of opening and closing. The duration t1 and t2 of the opening and closing are achieved by means of electrical delays incorporated into a motor unit and are chosen in such a way to prevent a too significant thermal increase in the motor unit.

On the graph on FIG. 1 is represented the intensity of the current through the electric motor during this sequence of the power supply, as well as the evolution of the temperature. The beginning of the blockage of the rotor is indicated by the dotted lines.

Generally, the length of time t2 during which the power supply of the motor is cutoff is generally longer than the length of time t1 during which the motor is powered. It is also possible to definitively stop the control of the motor after a certain number of power and cutoff cycles t1 and t2.

SUMMARY OF THE INVENTION

The goal of the invention is to improve the protection against thermal increases of a blocked rotor of an electronic motor unit incorporating an electric controller.

To this end, the invention proposes an electric motor unit with continuous current containing a connection plate and a card that carries electronics for the control of the motor, the card containing the means of monitoring the current in order to detect the blockage of the motor's rotor, characterized by the card and/or the plate carrying the means of defining a temperature sensor(s) and by the card also containing means that control the power supply of the motor and are linked to the means of defining a temperature sensor(s), so that to the means of current monitoring, the means of control cut the power supply of the motor when the blockage of the motor's rotor is detected and a temperature measured by the temperature sensor achieves a higher value threshold and reestablishes the power supply of the motor when the temperature is at least reduced to a lower value threshold.

BRIEF DESCRIPTION OF THE DRAWINGS

Other characteristics of the invention will become clearer in the following description which is purely illustrative and not limited, and which must be read in regard to the attached drawings in which:

FIG. 1 is a graph of time against the intensity of the power supply current in the motor, controlled by a known sequence allowing the protection of an electric motor involving a control electronics, when the blockage of the motor's rotor is detected, and also the evolution of the temperature of the motor unit during this power supply sequence;

FIG. 2 is a graph similar to that of FIG. 1 which illustrates a power supply sequence with the means of protection of the type proposed by this invention, FIG. 3 is a schematic representation of an electric motor unit with an electronic control incorporated, conforming to a possible method of production of this invention; and FIG. 4 is a schematic illustrating the wiring incorporating the means of protection of the type proposed by the invention.

DETAILED DESCRIPTION

As is shown in FIG. 2, the protection proposed by the invention consists of, once the rotor blockage is detected, cutting off the power supply of the motor when the temperature achieves a given threshold value T1 and reestablishes the power supply only once this temperature has lowered to a given threshold value T2.

To this effect, one advantageously uses, on the connection plate or on the printed circuit which carries the electronic control, a variable resistor sensor in regards to the temperature, for example, a sensor resistant to the negative temperature coefficient (NTC).

In a specific preferred method, the motor unit contains at least two temperature sensors, one on the electronic card and the other on the plate that carries the blades. One knows, in effect, that by production, the plate that carries blades and the electric motor is strongly decoupled thermally from the card that carries the electronics. In this way, the power supply of the electric motor is cut off once the temperature measure on the plate achieves a value of $T_p1$, or once the temperature measure on the electronic card achieves a value of $T_c1$.

The motor is not given new power until the temperature measured on the plate is at least lowered to a value of $T_p2$ or less, while the temperature measured on the electronic card is at least lowered to a value of $T_c2$.

For example, the cutoff temperature $T_p1$ is of the order of 200° C., while the cutoff temperature $T_c1$ is of the order of 130° C.; the temperature $T_p2$ is of the order of 160° C., and the temperature $T_c2$ is of the order of 120° C.

An example of a possible arrangement for the elements of the motor unit is, for example, illustrated on FIGS. 3 and 4. On FIG. 3, the body 1 of the electric motor has a rotational axis 2. The body 1 is closed at one end by a connection plate 3.

As one can see more clearly on FIG. 4, the plate 3 carries, first, the blades b of the motor and, second, connection strips to the ground (the body or radiators) or to the voltage of the battery. It also contains a circuit card 4, imprinted on which are different circuits incorporated in the power supply of the electric motor.

These different circuits are, for example, made up of a circuit 5 in order to use the voltage of the power supply delivered to the motor in order maintain the speed of the rotation to a value constant C, of an armed circuit 6 which is controlled by the circuit 5, grinder circuits, and generation of saw teeth 7 and 8, the means 9 for the generation of the voltage used by these different circuits from the voltage +bat of the battery, and means 10 forming a capacity of uncoupling. These circuits also contain a circuit 12 for monitoring the temperature and a circuit 13 for monitoring the current, both linked to the diagnostic circuit 14.

The circuit 12 for monitoring the temperature contains, for example, an NTC element 15 which is shown on the electronic card 4, so that the means to divisor node(s) and differential indicator(s) can compare the resistant value of this NTC resistance to the given thresholds.

This circuit 12 also contains the means of resisting, which are linked to an NTC resistor 16 which is mounted on the plate 3 and with which these means define one or some divisor node(s), in order to, with the means defining differential indicators, compare the resistive value of this NTC resistor 16 to the given thresholds. The means defining a sensor which makes up the resistor 16 are advantageously placed next to a shunt, a bobbin, or coils.

The current monitoring circuit 13 contains also an indicator assembly allowing comparison of one given threshold the value of the voltage to the "shunt" 17 terminal on the power supply circuit of the motor.

The signals leaving these different indicators are treated by the diagnostic circuit 14, which contains first a MOSFET power transistor which controls the power supply of the electric motor, and second the means for controlling this transistor as a function, notably, of the signals leaving the different indicators. Specifically, during a blockage of the rotor, the "shunt" 17 and circuits 13 and 14 detect the increase of the current of the power supply above a given threshold.

The resistors NTC 15 and 16, in combination with the circuits 12 and 14, allow the control of the power supply of the electric motor according to a sequence of the type that was previously described referring to FIG. 2.

Finally, the plate 3 also contains means 18 of filtering the voltage +bat of the power supply of the battery.

The electric motor unit that was just described finds advantageous application in the case of an electric motor of a heater, fan, or air conditioning of a motor vehicle. As a variation, the means 15, 16 defining the temperature sensor can be of the bimetallic type.

What is claimed is:

1. An electric motor unit containing a continuous current electric motor, a connection plate, a card carrying electronics for controlling the motor, means defining a temperature sensor, the card containing means for monitoring the current in order to detect a blockage of the motor rotor as well as means for controlling a power supply of the motor, the means for controlling the power supply linked to the means defining a temperature sensor and to the means for monitoring the current, characterized by the electric motor, the control card, and the connection plate forming a unit, and once the unit receives, from the means for monitoring the current, a signal indicating the blockage of the rotor, controlling the means for controlling the power supply of the motor according to a functioning sequence where the power supply is cut off when a first temperature measured by the means defining a temperature sensor reaches a high threshold value and where the power supply is automatically reestablished when a second temperature measured by the means defining a temperature sensor has fallen below a low threshold value.

2. The electric motor unit according to claim 1, characterized by the means defining a temperature sensor including first means defining a temperature sensor placed on the plate, and second means defining a temperature sensor placed near the card.

3. The electric motor unit according to claim 2, characterized by the card containing the means for controlling the power supply to cut off the power supply of the electric motor when at least one of the temperature of the plate reaches a given value $T_p1$ and the temperature of the card reaches a given value $T_c1$ and to automatically reestablish the power supply to the motor when the temperature measured on the plate is in a range of $T_p2$ and below and the temperature measured on the electronic card is in a range of $T_c2$ and below.

4. The electric motor unit according to claim 3, characterized by the temperature $T_p1$ being 200° C., while the temperature $T_p2$ is 160° C.

5. The electric motor unit according to claim 3, characterized by the temperature $T_c1$ being 130° C., while the temperature $T_c2$ is 120° C.

6. The electric motor unit according to claim 1, characterized by the means defining a temperature sensor containing at least one resistor variable as a function of the temperature.

7. The electric motor unit according to claim 1, characterized by the means defining a temperature sensor containing at least one resistor resistant to the negative temperature coefficient.

8. The electric motor unit according to claim 1, characterized by the means defining a temperature sensor having a bimetallic element.

9. The electric motor unit according to claim 2, characterized by the first means defining a temperature sensor placed near one of a shunt, bobbin, and coils.

10. A heater, fan, or air conditioning electric motor unit characterized by being made up of a unit according to claim 1.

11. In combination with an electric motor unit comprising a continuous current electric motor with a rotor, a connection plate, an electronics card carrying electronics for controlling the motor, and means for detecting current, the improvement comprising:
    at least one means for sensing temperature mounted on at least one of the connection plate and the electronics card; and
    means for controlling a power supply to the motor while the means for detecting current indicates a blockage of the rotor of the motor wherein the means for controlling the power supply cuts off the power supply when the at least one temperature sensing means senses a first temperature above a high threshold value and automatically re-establishes the power supply when the at least one temperature sensing means senses a second temperature below a low threshold value.

12. The improvement of claim 11 wherein the at least one temperature sensing means comprises first means for sensing temperature mounted on the connection plate and second means for sensing temperature mounted on the electronics card.

13. The improvement of claim 12 wherein the power supply controlling means comprises means for cutting off the power supply of the electric motor when at least one of the first temperature sensing means detects a temperature above $T_p1$ and the second temperature sensing means detects a temperature above $T_c1$ and automatically re-establishing the power supply of the electric motor when the first temperature sensing means detects a temperature in a range of $T_p2$ and below and the second temperature sensing means detects a temperature in a range of $T_c2$ and below.

14. The improvement of claim 11 wherein the power supply controlling means and the current detection means cooperate to prevent re-establishment of the power supply after a predetermined period of time passes and blockage of the rotor is indicated.

15. The improvement of claim 11 wherein the at least one temperature sensing means comprises at least one of a resistor variable as a function of the temperature and a resistor resistant to the negative temperature coefficient and a bimetallic element.

16. A method of controlling an electric motor unit comprising a continuous current electric motor with a rotor, a connection plate, an electronics card carrying electronics for controlling the motor, and means for detecting current, the method comprising the steps of:

sensing a temperature using at least one means for sensing temperature mounted on at least one of the connection plate and the electronics card; and controlling a power supply to the motor while the current detecting means indicates a blockage of the rotor of the motor, wherein the step of controlling the power supply further includes the steps of:

cutting off the power supply when the at least one temperature sensing means senses a first temperature above a high threshold value; and automatically re-establishing the power supply when the at least one temperature sensing means senses a second temperature below a low threshold value.

17. The method of claim 16 wherein the at least one temperature sensing means comprises first means for sensing temperature mounted on the connection plate and second means for sensing temperature mounted on the electronics card.

18. The method of claim 17 wherein the controlling step further comprises the steps of:

cutting off the power supply of the electric motor when at least one of the first temperature sensing means detects a temperature $T_p 1$ and the second temperature sensing means detects a temperature $T_c 1$ and automatically re-establishing the power supply of the electric motor when the first temperature sensing means detects a temperature in a range of $T_p 2$ and below and the second temperature sensing means detects a temperature in a range of $T_c 2$ and below.

19. The method of claim 16 wherein the controlling step further comprises the step of preventing reestablishment of the power supply after a predetermined period of time passes and the current detecting means still indicates a blockage of the rotor of the motor.

20. The method of claim 16 wherein the at least one temperature sensing means comprises a temperature sensor containing at least one of a resistor variable as a function of the temperature and a resistor resistant to the negative temperature coefficient and a bimetallic element.

* * * * *